(12) United States Patent
Payne

(10) Patent No.: US 9,194,459 B2
(45) Date of Patent: Nov. 24, 2015

(54) CYCLE TRANSMISSION EXHIBITING LOW STEERING INTERFERENCE EFFECTS

(71) Applicant: Thomas Andrew Payne, Arlington, TN (US)

(72) Inventor: Thomas Andrew Payne, Arlington, TN (US)

(*) Notice: Subject to any disclaimer, the term of this patent is extended or adjusted under 35 U.S.C. 154(b) by 0 days.

(21) Appl. No.: 13/843,678

(22) Filed: Mar. 15, 2013

(65) Prior Publication Data

US 2014/0265217 A1    Sep. 18, 2014

(51) Int. Cl.
| | |
|---|---|
| *B62K 3/02* | (2006.01) |
| *B62D 61/06* | (2006.01) |
| *F16H 1/28* | (2006.01) |
| *B62K 3/00* | (2006.01) |
| *B62K 5/02* | (2013.01) |
| *B62K 21/00* | (2006.01) |

(52) U.S. Cl.
CPC *F16H 1/28* (2013.01); *B62K 3/005* (2013.01); *B62K 5/02* (2013.01); *B62K 21/00* (2013.01)

(58) Field of Classification Search
CPC ........ B61D 61/06; B61D 61/08; B62K 3/005; B62K 3/14
USPC ........................................ 280/288.1; 180/211
See application file for complete search history.

(56) References Cited

U.S. PATENT DOCUMENTS

| | | | |
|---|---|---|---|
| 4,694,708 A * | 9/1987 | Hartmann | 475/269 |
| 4,773,663 A * | 9/1988 | Sawyer et al. | 280/261 |
| 5,030,179 A * | 7/1991 | Ganoung | 475/50 |
| 5,326,121 A | 7/1994 | Fisher | |
| 5,823,554 A * | 10/1998 | Lau | 280/261 |
| 6,749,211 B1 * | 6/2004 | Yliniemi | 280/254 |
| 7,048,289 B2 * | 5/2006 | Lau | 280/252 |
| 7,670,242 B2 * | 3/2010 | Bucknor et al. | 475/5 |
| 8,256,784 B2 * | 9/2012 | Hadzicki et al. | 280/244 |
| 8,714,576 B2 * | 5/2014 | Moldestad | 280/240 |
| 2004/0188974 A1 * | 9/2004 | Lau | 280/258 |
| 2008/0252037 A1 | 10/2008 | Wesling et al. | |
| 2009/0278330 A1 * | 11/2009 | Hartmann | 280/202 |
| 2012/0318595 A1 | 12/2012 | Belenkov et al. | |

FOREIGN PATENT DOCUMENTS

CA    2316484    2/2002

* cited by examiner

*Primary Examiner* — Joseph Rocca
*Assistant Examiner* — Marlon Arce
(74) *Attorney, Agent, or Firm* — William S. Parks; Hulsey, Hunt + Parks, PC

(57) ABSTRACT

A novel transmission for cycles that significantly reduces torque interference with steering operations is provided. Such a transmission allows for improved recumbent cycling capabilities. The inventive device thus includes a combination of a fixed transmission assembly that reduces torque levels and a movable transmission assembly that multiplies torque levels, allowing for the avoidance of high torque effects through the vehicle's steering axis. As such, the capability of the overall cycle device to steer properly and to a rather wide angle from center while implementing such a torque transfer protocol allows for a unique recumbent cycle configuration. Such a device, then, may be utilized for a human-powered cycle vehicle or one that further includes an electrical component to allow for automated drive capabilities through a rear wheel or wheels, as well. The method of implementation of such a transmission within a variety of cycle devices is also encompassed within this invention.

23 Claims, 8 Drawing Sheets

CYCLE TRANSMISSION EXHIBITING LOW STEERING INTERFERENCE EFFECTS

FIELD OF THE INVENTION

The present invention pertains to a novel transmission for cycles that significantly reduces torque interference with steering operations. As well, such a transmission allows for improved recumbent cycling capabilities. The inventive device thus includes a combination of a fixed transmission assembly that reduces torque levels and a movable transmission assembly that multiplies torque levels, allowing for the avoidance of high torque effects through the vehicle's steering axis. As such, the capability of the overall cycle device to steer properly and to a rather wide angle from center while implementing such a torque transfer protocol allows for a unique recumbent cycle configuration. Such a device, then, may be utilized for a human-powered cycle vehicle or one that further includes an electrical component to allow for automated drive capabilities through a rear wheel or wheels, as well. The method of implementation of such a transmission within a variety of cycle devices is also encompassed within this invention.

BACKGROUND OF THE INVENTION

Traditional manual bicycle operations involve the utilization of a chain to allow for transfer of power from a pedal gear to a wheel gear to provide the necessary rotational energy for vehicle propulsion. Such standard devices generally require the user to "stand" on the vehicle to provide suitable torque to the pedals for sufficient force for motion to occur. The chain component drives a rear wheel in such an operation while the front wheel is present for balance and steering purposes with a handlebar configuration for control. Unicycles and tricycles typically utilize pedal cranks on opposing sides of a wheel (front for a typical tricycle) where the user's feet generate power directly through a axis representing the center of the wheel itself. Such activities are generally difficult to undertake as the capabilities of the user to generate sufficient force for certain speeds and/or to maneuver the vehicle up an incline are substantial. Additionally, such a pedal crank configuration requires the pedaling and steering capabilities to reside in the same plane, making the overall activity taxing on the user. If pedaling occurs during turning, the user's legs must adjust to differing angles and lengths until the direction is straightened. With the necessity to provide varying forces to either pedal while in the middle of a turn, as well, steering may be compromised to a certain extent as well, requiring the user to compensate for such potential difficulties.

As it is, some developments have been provided to permit reduced force for increased bicycle velocities (or improved incline climbing capability), such as the utilization of multiple gears for shifting between "low" and "high" torque generation levels. These improvements, however, still rely upon the involvement of a chain assembly and, more so, require the cyclist to remain in an upright position thereby generating force through a combination of muscle and gravity. Tricycle and unicycle devices have not been improved to any such extent, except for the involvement of chain assemblies in certain circumstances which, again, revert back to the traditional types of cycles.

Recumbent bicycles have been available within the industry for quite some time, providing a unique alternative to the upright cycling position with resultant potential exercise workout improvements for such users. These devices, however, still primarily involve the utilization of chains to transmit suitable drive power from front-positioned pedals to a rear wheel. In any event, there still remains a rather limited extent of cycle device configurations with the vast majority still reliant on old chain-based technology.

There have also been front-wheel powered chain assemblies undertaken within the cycling industry, as well. These unique constructions, however, require problematic configurations whereby, for example, the chain is either twisted across a plane of steering rotation, or a universal joint is used to bridge both moving (rotating about steering axis) and non-moving drive shaft axes. In either case, the resultant steering motion is compromised significantly, and particularly in comparison with traditional, rear-wheel drive bicycles. Such issues may deleteriously impact the stability of such a device as well as severely restrict its maneuverability, too. As such, these configurations are functionally deficient due to misapplication of the power transmission technologies employed. In particular, such power drive chains exhibit small allowable range of angular deflection within useful torque transmission limits due to the odd configurations of chain movement involved.

There have been some other developments that have taken into consideration the capabilities of epicyclic gear configurations for power transmission within a cycling operation. To that end, such devices tend to utilize a gear train to transmit power across a plane of steering rotation by use of a sun gear coaxial to a steering axis. In principle, this arrangement may allow relatively unrestricted steering, with a further benefit of a high efficiency spur gear transmission. This configuration may overcome, to a limited extent, certain problems of interference with manual steering induced by drive torque reactions within an epicyclic transmission arrangement through the inclusion of dual, counter-rotating sun gears. In this manner, parallel and opposite transmission paths to a front wheel hub axis are permitted which, in theory, imparts a remedial reaction force imparted to a steering fork to evenly divide into opposing and canceling components. However, in practice such an overall design would actually work to favor power transmission through one path over another; such force divisions then would appear to result in dominance of one over the other instead of an evenly shared undertaking by both available structures. The resultant canceling effect would thus be compromised or even lost entirely in that scenario. There is no remedy for such problems through, for instance, a significant torque-reduction between epicyclic gears and a pedal crank, let alone through any other accompanying compensation of torque multiplication between epicyclic gears and a driven wheel. In other words, the high torque required of such a past epicyclic gear configuration still results in a significantly high required torque for operation, leaving such power generation on the user to provide. Likewise, a failure of theoretical torque-reaction canceling may result in significant, unbalanced force acting on a steering fork. Normal fluctuations in input torque and/or rolling resistance of a driven wheel will cause like fluctuations in such a force, tending to change a steering direction unless sufficiently countered by a control reaction of an operator. It is likely that such forces can be sufficient under certain circumstances to cause loss of control by an operator.

Thus, what remains is a distinct need to provide a cycle device (bicycle, tricycle, for instance) that allows for a user to utilize low power generation for proper motion to occur for cycle movement to climb inclines or achieve higher speeds while the torque necessary for such a result does not impede the steering capability thereof, simultaneously. To date, as noted above, this result has yet to be provided within the pertinent prior art.

ADVANTAGES AND SUMMARY OF THE INVENTION

One distinct advantage of this invention is the capability of allowing for unimpeded steering through independent pedal cranking in front of a steering column. Another advantage of this invention is the ability to generate sufficient torque for cycle motion and propulsion through direct rotational energy of a single front wheel. Yet another advantage of this invention is the potential to provide a modular cycle device that includes a front wheel/pedal crank assembly that may be separated and attached to a body portion on demand. Still another advantage of this invention is the potential to utilize such a cycle device in conjunction with a rear wheel assembly of any type, including one that includes a rear trunk to permit safe and secure transport of articles. Even still another advantage of the inventive device is the capability of combining the front-wheel pedal crank component to an electrical rear-wheel device for a hybrid vehicle that may involve independent front- and rear-wheel energy utilization for movement or a combination of both simultaneously. Yet another advantage, then, of this inventive device is the capability for a user to select the employment of low impact pedal cranking to properly transport the device on a suitable surface if the electrical component has depleted its energy supply. Still another advantage is that isolated front and rear drive means permits independent optimization of both separately for greater functional efficiency of the overall vehicle.

Accordingly, this invention encompasses a vehicle transmission that comprises a fixed transmission assembly component that exhibits torque reduction and a subsequent movable transmission assembly component that exhibits torque multiplication. The same transmission that thereby allows for reduction of torque interference with vehicle steering is also encompassed herein. Also encompassed herein is a recumbent cycle device including an the transmission described above, wherein said cycle is capable of locomotion solely through a front wheel drive operation. The invention further encompasses a recumbent cycle device that includes a front wheel and at least one rear wheel, wherein said device operates manually through a pedal crank assembly directly powering motion of said front wheel alone, and wherein the operation of said pedal crank assembly does not generate any appreciable torque interference with the steering of said vehicle. Further encompassed within this invention is a recumbent cycle device that includes a rear component having two opposing wheels and space behind the recumbent seat for a trunk component to be placed for transport of articles therein during movement of said cycle. Such a cycle device including electrical power generation for movement of at least one of said two rear wheels in addition to the manual operation of said front wheel is also within the scope of this invention.

The inventive cycle device thus includes a unique manually operated transmission that is effectuated through a pedal crank that is aligned through a gear assembly to reduce the torque generated thereby by a sufficient amount to reduce interference with the steering capability during actual operation. Such a transmission allows for torque reduction until the kinetic energy generated through the gear device is transferred to an epicyclic gear assembly that subsequently provides an increase in torque for delivery to the wheel. In this manner, although the torque generated by the user may be relatively high, the steering effect of such a level will not deleteriously impact the steering capacity of the cycle device as a result. Generally, it has long been understood that the greater torque generated by a vehicle, whether manually or mechanically supplied, will potentially cause a steering effect as the force vector created by such torque application creates a condition wherein the magnitude thereof is prone to remain constant. Any excessive torque application may cause difficulty to the person steering as the vehicle will naturally seek to remain in a direction that is associated with the force vector in effect at that moment. Thus, the power needed to overcome such a situation can be quite substantial (due to the equal power generation being the product of the applied torque and resultant speed of the vehicle). Other devices (such a automobiles, for instance) can compensate for such phenomena through proper engineering developments. With pedal crank cycles, however, these issues have not been considered to such a degree, if at all. Thus, the inventive transmission allows for a recumbent cycle device that allows a user to properly steer with minimal, if any, interference from the torque generated thereby.

The inventive transmission thus utilizes suitable gear technology to accord the necessary level of low torque steering effect. A chain assembly, although generally efficient to permit high torque generation as needed, does not allow for any significant torque reductions as is needed for this purpose. The inventive device, thus, involves the utilization of suitable gears that allow for torque dissipation through proper sequential size decreases, transfer to a lower epicyclic gear assembly without losing power but with a drastic torque reduction, and then multiplication of torque through an increase in sequential gear sizes until transfer of torque and power to the wheel. The ratio of torque decrease is preferably at least 1/10, and may be as high as or even higher than 1/24, preferably, in order to meet the necessary requirements for minimal steering interference.

Such a ratio thus pertains to the ability to reduce the torque level from the pedal crank assembly to an initial adjustable gear assembly at least 10 times, preferably up to 24 (or higher), and then to return the torque level to at least substantially near the initially supplied level for delivery of suitable torque to the front wheel of the cycle device. To accomplish this, suitable gears are supplied that transfer energy while lowering torque levels to a gear assembly that includes multiple drive shafts with different spur gears in place with smaller diameters that the initial pedal crank gear, thus permitting a reduction in torque from the initial application. This system further provides the capability of transferring power via a plurality of spur gears to a lower height and over the effected wheel (not to mention directly below the steering shaft or column). With the resultant torque reduction in this higher gear assembly (at a height very near that for the pedal crank gear and assembly itself), the transfer of power to the lower epicyclic gear assembly thus allows for a gradual increase in sequential gear sizes to ramp up the torque at that point to ultimately transfer substantially the same torque as generated at the pedal crank gear to the gear interfaced with the cycle device front wheel. Additionally, the higher transmission component (i.e., substantially level with the pedal crank assembly) may be configured to allow for at least two different speeds through selective movement of at least one spur gear on one of the multiple drive shafts employed therein. With proper movement of such a spur gear, the potential to engage a high or low speed is provided to allow the user greater ease for manual operation in certain situations. Overall, this surprisingly effective manually operated transmission system thus allows for greater control by the user during use in terms of steering, even when high torque generation occurs. The actual transmission configuration is discussed in greater depth below.

With this beneficial configuration in place, a cycle device that permits a recumbent operation and manually activated front wheel drive is permitted. As a result, the remainder of the cycle vehicle may be configured itself to any suitable structure for the most efficient overall utilization of such available space. For instance, in one potentially preferred embodiment, a three-wheel vehicle may be provided that includes significant area behind the user's seat for storage transport or even possible passenger placement. Likewise, a battery, fuel cell, or other type of electricity generator may be included in such a space that allows for rear wheel automation as a supplement to the manual operation accorded through the recumbent pedal crank assembly. In this manner, a single wheel may be configured for such an electrical generation capability, or both, if desired. Additionally, with this type of vehicle, there may be possible the concurrent utilization of both a manual activity and automated rear wheel motion for any desired reason (climbing inclines, transporting heavier cargo, etc., for instance). With the manual operation capability, as well, should the electrical generator component become depleted during operation, the user would not be forced to await aid to maneuver the vehicle since the recumbent pedal crank assembly would still be effective.

Such a device may thus be suitable for individuals that seek the utilization of a motorized device but also need a manual vehicle for exercise purposes. With recumbent technology, stresses normally associated with traditional bicycles are reduced and the activity is considered highly effective as a result. Additionally, the capability to provide a suitable higher speed vehicle (up to, for example, 25 miles per hour) in relation to the electrical generation components alone or in combination with the manual operation would thus be attractive for certain close-to-home errands for certain individuals. In particular, the storage potential and capacity over such rear wheels would accord a user a manner of transporting goods or wares easily for certain distances without the need for an automobile and in a manner that is far better than for motorized carts (as one example). Such carts travel rather slowly, have no appreciable storage capacity, and do not include any means for exercise capacity. The inventive cycle device may thus allow for a significant improvement in this area with a stable steering device that will exceed minimal cart-related speeds, and can permit storage and/or passenger transport as well.

If desired, too, the recumbent cycle device may be configured to include a single rear wheel for a typical bicycle appearance (at least for a recumbent design). In such a manner, the front wheel operation would allow for maneuverability with limited steering interference due to the pedal crank torque generated by the user, as noted above. The entire front wheel/transmission/pedal crank assembly may actually be provided in a module format that facilitates removal and placement on a different recumbent structure on demand, as well. Thus, interchangeability of the inventive transmission assembly in such a manner accords greater versatility to a user to enjoy the benefits of high torque/low steering interference properties in a recumbent cycle device situation. Additionally, the front wheel/transmission/pedal crank assembly (i.e., the front wheel assembly) may also be disposed in a manner that allows for a hinged connection to the frame. In this manner, the front wheel assembly may be maneuvered in a way to allow for a more compact structure to facilitate transport, storage, and the like.

The transmission itself is preferably constructed from sufficiently strong metal components to best ensure proper operations over an appreciable time period. The upkeep for gear components is relatively low in comparison with chain devices, for example, as well, and the presence of a protective cover over the transmission can effectively deflect potentially damaging external elements. The wheels may be of any type, whether inflatable or solid in structure, as well. The front wheel will include a bevel gear incorporated therein around the central axis to accord the proper rotational movement during operation and through the interface with a properly disposed bevel gear from the epicyclic gear assembly beneath the steering shaft. The user will have available a properly reclined seat that allows for adjustment in order to permit pedal crank assembly reach while in a recumbent position. Such a seat may be of any type, including, for example, padding for comfort, and potentially aligned for proper spinal, gluteal, etc., shape for comfort purposes as well. The seat is preferably placed on a frame that may connect, releasably, to the front wheel steering/transmission/pedal crank component in a secure fashion. The frame may then extend behind the seat to accord a proper area for a single or two-wheel configuration, as discussed above. As well, the frame may then be configured to accept a storage structure or like component (a child seat, for instance), as well. The steering component will thus include a suitable fork handlebar structure (or other recumbent-acceptable steering device) that extends above the level of the pedal crank assembly and transmission, too. The steering device will thus include a column (or shaft) that is directly connected with a suitable turning assembly that includes arms that extend downward on either side of the front wheel and connect to an attachment device on either side of the axis thereof, to allow for free motion of the wheel thereof during operation. If the electrical generation motion capability is activated (and thus the user chooses not undertake manual operation at a certain time), the front wheel will not exhibit motion and/or rotation due to the presence of a suitable clutch assembly.

This overall configuration thus also allows for maximum individual efficiencies for front and real wheel drives. Since the front wheel assembly is totally independent from that behind the operator's seat, design and engineering details may be centered on these separate drive sections to optimize both in isolated fashion, thus according an overall cycle vehicle (whether completely manually operated or in a hybrid fashion) that lacks inherent compromises in design limitations due to any need for front and rear wheel interactions or considerations.

DETAILED DESCRIPTION OF THE DRAWINGS AND PREFERRED EMBODIMENTS

Figure 1:
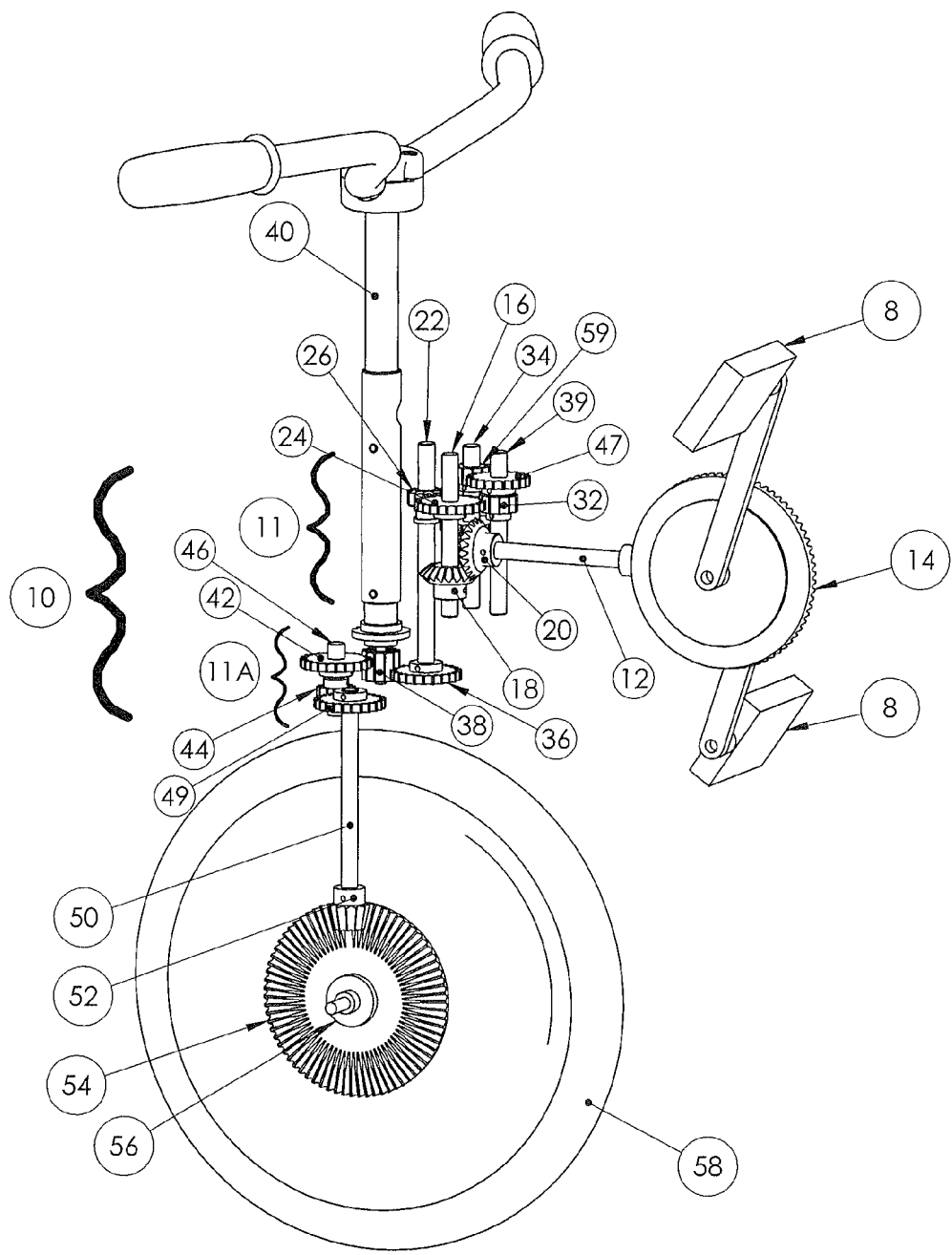
FIG. 1 shows a side view of a potentially preferred embodiment of an inventive manually operated transmission when incorporated within a cycle device.

The invention is herein described in greater detail through the utilization of the accompanying drawings. By no means are these drawings and accompanying descriptions intended to limit the scope of the invention as the ordinarily skilled artisan within this area would fully understand the breadth of the inventive device(s) herein discussed.

As alluded to above, the inventive manually operated transmission includes a fixed transmission assembly component that leads subsequently to a movable transmission assembly component, such that the fixed component allows for significant torque reduction and the movable component (through, for example, the utilization of an epicyclic gear configuration) increases torque output. This effectively provides a cycle device that allows for significant torque generation for manual operation with minimal effect on its steering capacity, thus allowing for a significant range of stable angular movement at any speed. As well, being recumbent in configuration, the user will not require undesirable lateral leg muscle movement for operation.

Thus, as discussed in greater detail below, a torque reduction gear train is present that utilizes spur gears fixed to shafts mounted by standard bearings within rigid, lightweight transmission housings. The inventive transmission is neatly divided between fixed (input) stages and movable (output) stages in order to accord the necessary torque dissipation and eventual increase. The fixed stages are suitably attached to the subject vehicle frame and the movable (rotatable, for instance) stages are incorporated within a fork assembly that accords simultaneous steering and, when manually operated, driving of the vehicle front wheel. This configuration thus allows for the reduction of any necessary compensation forces to react to a high torque effect over the steering axis during operation, thus allowing the operator a greater potential for control. The low input and output power levels accorded this overall system thus allows for commercially standard parts that do not require high-grade strength for compensatory high torque effects. As well, the utilization of a single transmission path for power transfer allows for the utilization of a limited number of needed component parts, thereby allowing for a cost-effective overall result that can be maintained rather easily. A wheel hub with internal, planetary gear sets of selectable drive ratios is thus employed for interface with a movable transmission assembly attached to a fork component while a separate, selectable gear train of multiple reduction ratios is incorporated in a fixed transmission. Such a design may be possibly considered analogous to the chain drive transmission of a standard ten-speed bicycle, but without the necessity for such a chain system. The overall function accorded through the utilization of such a novel transmission configuration is therefore equivalent to a normal bicycle transmission.

Again, as alluded to above, a key aspect of the invention is a relatively low torque transmitted through an interface of epicyclic gears about a steering axis. A contact force on a line of action between a sun gear and a planet gear on a steerable portion (output side) of a transmission has two possible significant effects: it may cause rotation of a planet gear about its axis, or it may cause rotation of a planet gear about a sun gear axis, or some combination of effects. Because the sun gear is coaxial to a steering axis, the latter effect manifests as an undesirable force acting to steer a vehicle to one side, especially when rotation of a driven front wheel is suddenly or unusually impaired or resisted by external forces. Greatly reducing a torque transmitted between a sun gear and a planet gear likewise reduces a contact force between gears, and so minimizes a force potentially affecting vehicle steering and control. Torque multiplication gearing between an output planet gear and a wheel axle thus restores final drive torque to a desired magnitude to overcome such potential steering difficulties, thus further enhancing the overall effect provided with this inventive device.

Thus, the inventive transmission accords surprising and beneficial characteristics to a recumbent cycle device, namely the ability to provide high mechanical efficiency so the operator does not expend too much energy during actual operation, while permitting nearly unrestricted steering function and a sizeable steering motion range, and little to no steering control effect through pedal-created torque.

Figure 2:
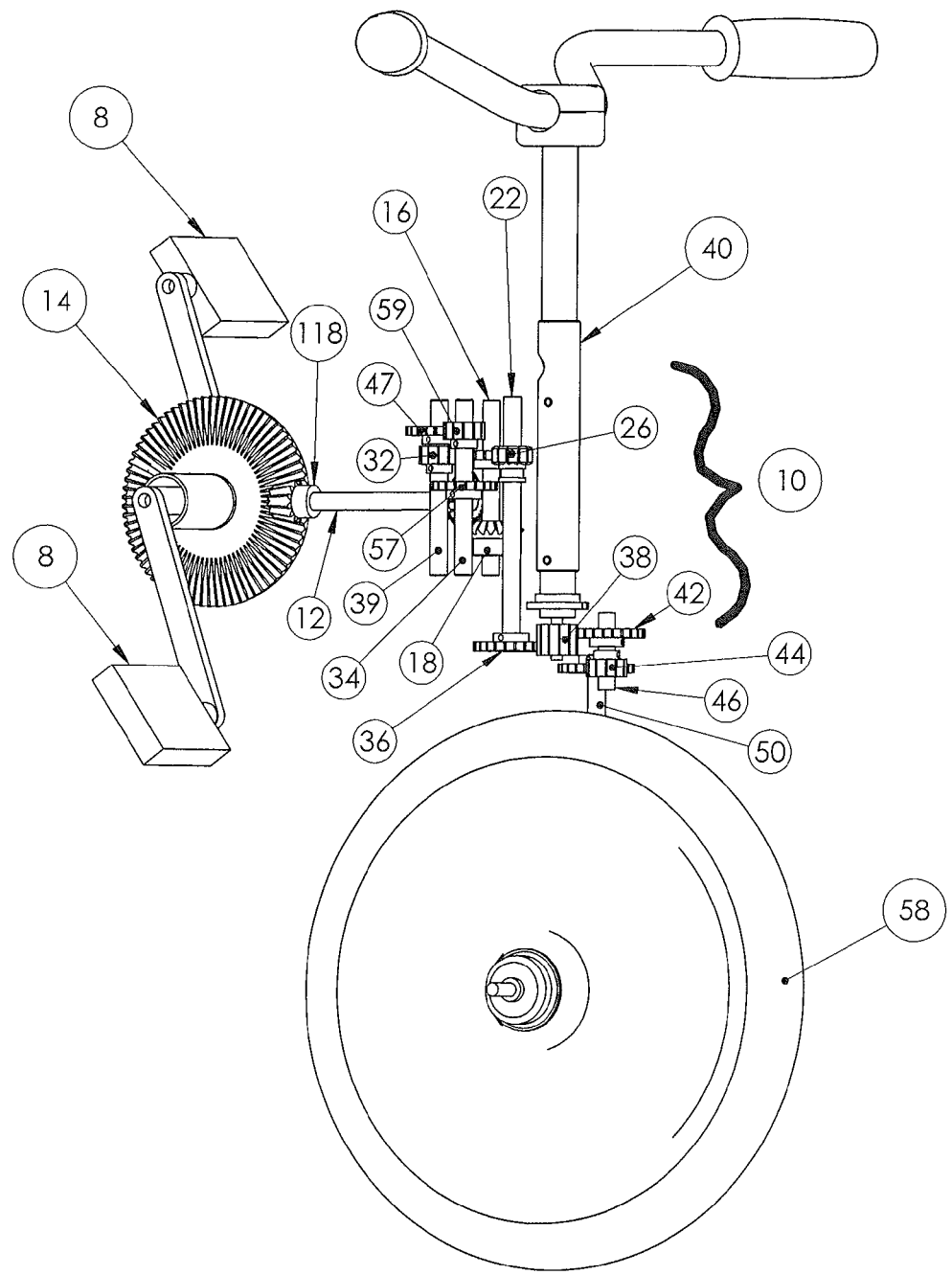
FIG. 2 shows the opposing side view of the same transmission as in FIG. 1.

With all of this provided by the inventive transmission and thus the inventive manually operated recumbent cycle device, potentially preferred, though not necessarily required, embodiments are further provided within the drawings. FIG. 1 provides a view of an uncovered inventive transmission 10 assembly, while FIG. 2 depicts the same assembly but at the opposite viewpoint. A crank drive shaft 12 transmits rotation of a pedal crank gear 14 (turned through rotational force to the pedals 8) through a suitably disposed bevel gear 118 to an intermediate shaft 16 via two interfaced bevel gears 18, 20. Further torque reduction is then selectively achieved through transmission of rotation from the intermediate shaft 16 to a second intermediate shaft 22 via the utilization of a spur gear 24. Such a second intermediate shaft 22 includes an adjustable spur gear 26 that may allow for a direct drive function through the manually selected interface with the spur gear 24 on the first intermediate shaft 16. Alternatively, then, the first intermediate shaft 16 also may transfer power to a third intermediate shaft 39 via another small diameter spur gear 32 to further provide reduction gear stages. An upper larger diameter spur gear 47 on the third intermediate shaft 39 then interfaces with a spur gear 59 on a fourth intermediate shaft 34. The fourth intermediate shaft 34 then includes a further larger diameter spur gear 57 that is available for interface with the adjustable spur gear 26 on the second intermediate shaft 22. Such activation of the adjustable spur gear 26 in that manner creates an overdrive function allowing for attainment for higher speeds. The fixed transmission assembly 11 thus leads pathwise through either direct or overdrive alternatives to the second intermediate shaft 22 that then extends downward to the lower movable transmission assembly 11A where it interfaces the sun gear 38 through a spur gear 36. A final torque reduction occurs then at such a sun gear 38 spur gear 36 interface. The sun gear 38 is positioned coaxially with a steering shaft 40 and contains bearings enabling gear rotation independent of movement of the coaxial steering shaft 40 and thus permits the drive of a torque multiplication planet gear 42 affixed to a rotating drive shaft 46 that rotates a further spur gear 44 that interfaces with a final spur gear 49 to provide final torque multiplication which, in turn, rotates a drive transmission shaft 50 that leads to a bevel gear 52 that interfaces with a bevel hub gear 54 affixed to a drive hub 56 on the front wheel 58.

Figure 3:
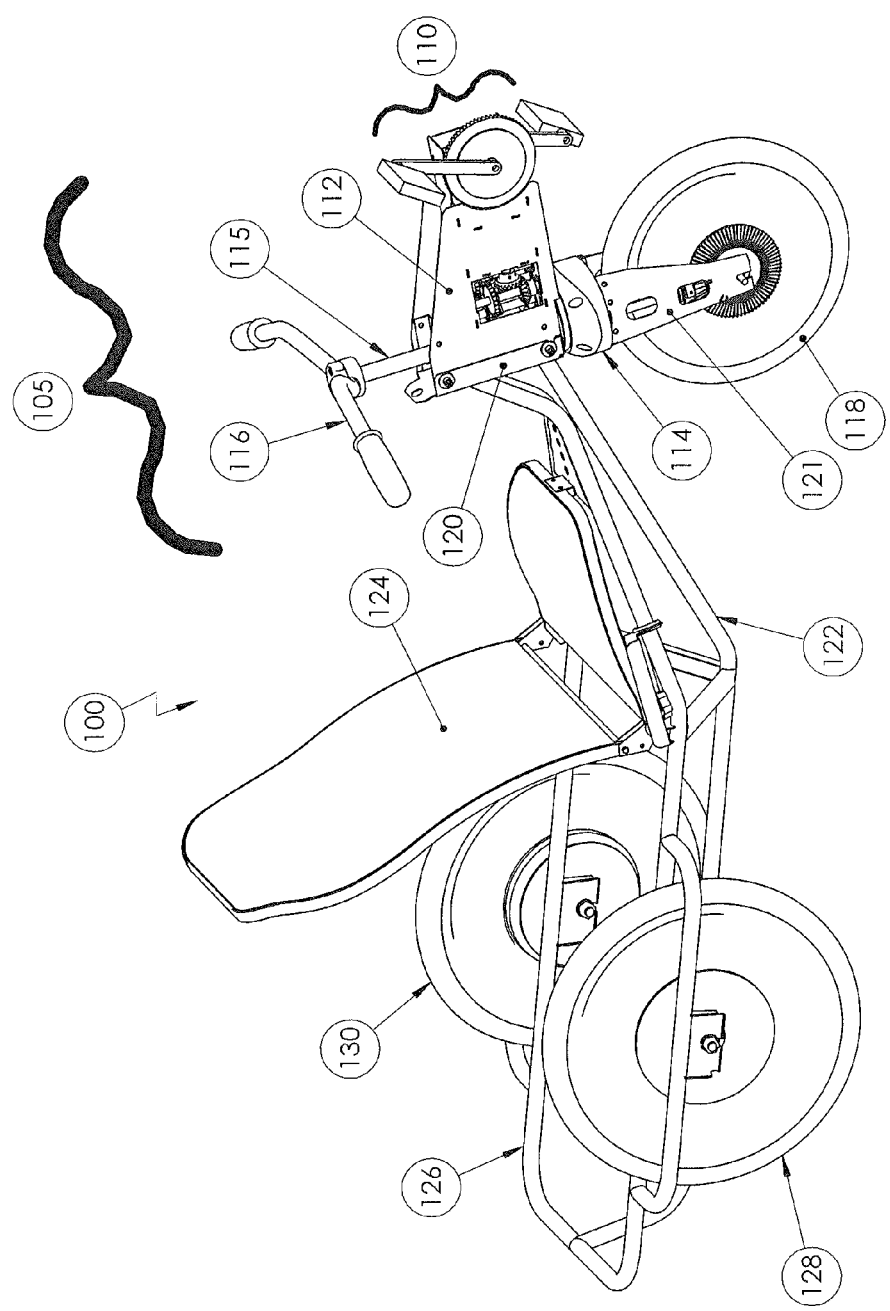
FIG. 3 depicts perspective view of one potential embodiment of the invention showing a three-wheel cycle with a manual front wheel component and electrically powered rear wheels.

FIG. 3 shows a tricycle device 100 including a pedal crank assembly 110 and an uncovered fixed transmission component 112 and movable transmission component (12 of FIGS. 1 and 2). A steering shaft 144 includes handle bars 116 to allow for steering of the front wheel 118 that is connected through a fork assembly 121. The front wheel assembly in total 105 further includes a connector plate 120 for attachment to a frame 122. A seat 124 is situation behind the front wheel assembly 105 in a recumbent position. The frame 122 includes a support component 126 to which opposing rear wheels 128, 130 are disposed external to the seat position 124. In this depiction, the rear wheels 128, 130 move solely in relation to the manual operation of the front wheel assembly 105.

Figure 4:
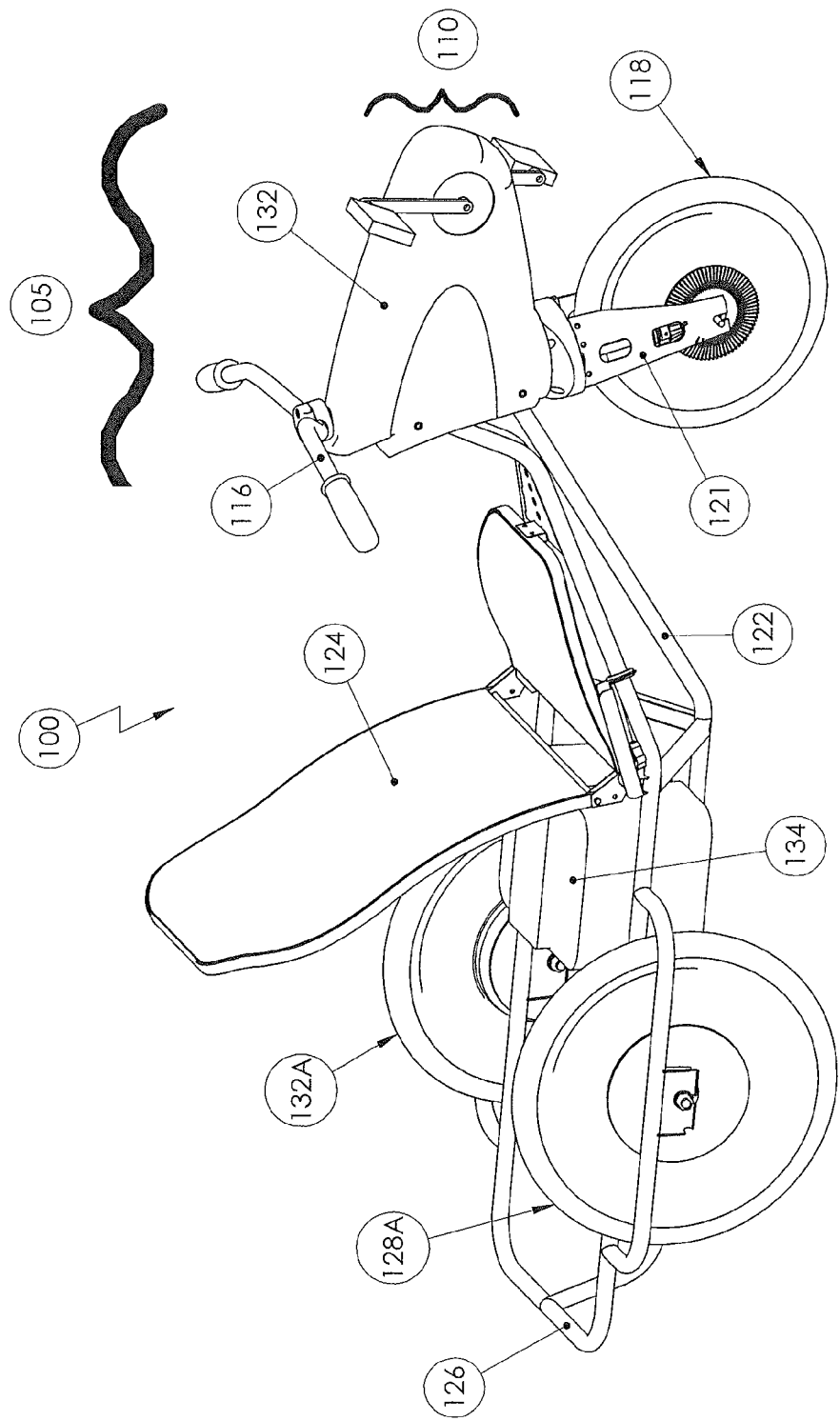
FIG. 4 shows the same perspective view as in FIG. 3 with the cover of the transmission removed.

FIG. 4 shows a tricycle with a cover 132 over the transmission assemblies (112, 114 of FIG. 3, for instance). In this depiction, the rear wheels 128A, 130A are connected to an electrical generator 134 to allow for automated motion without the need for manual operation or in supplement thereto.

Figure 5:
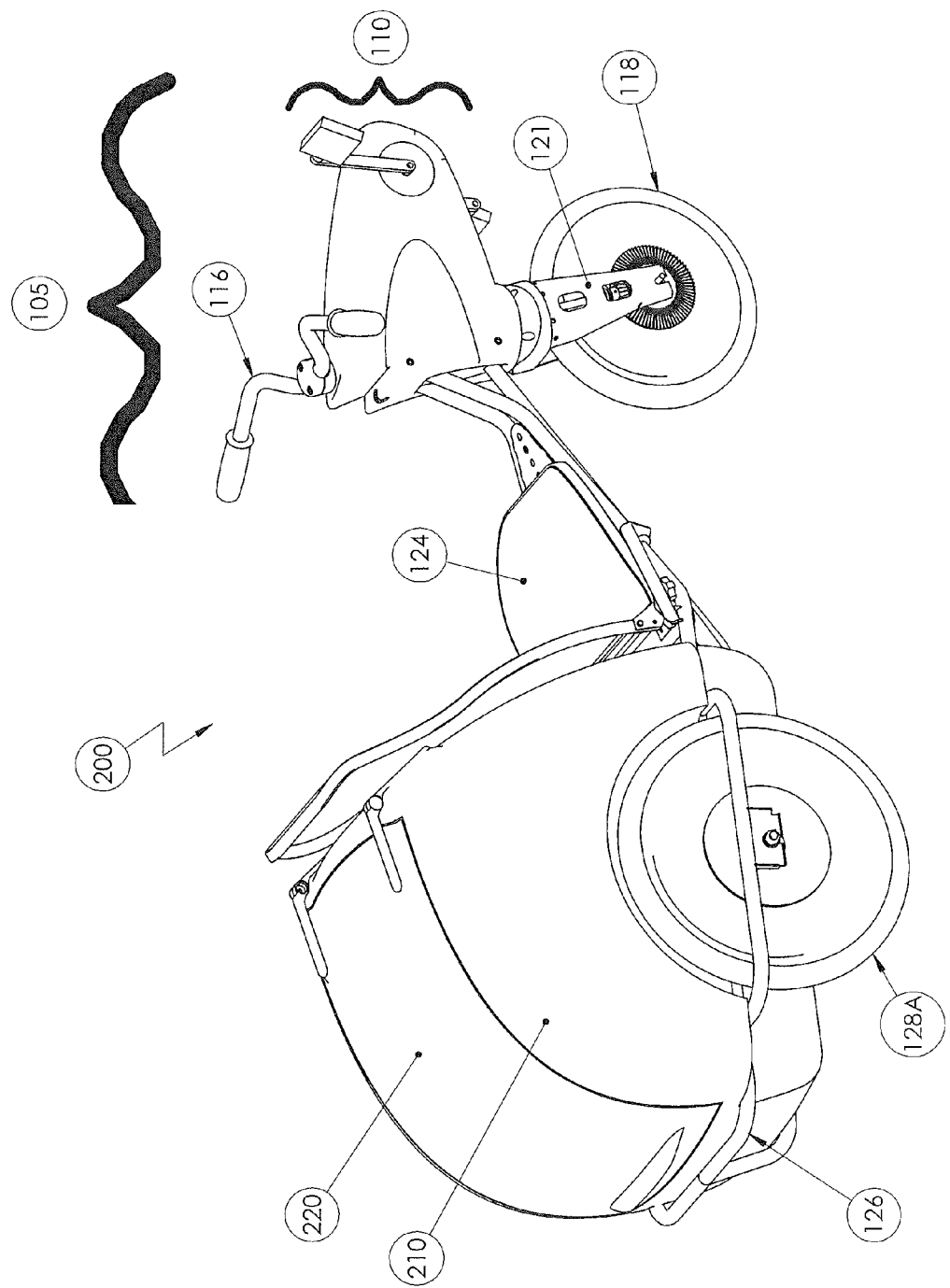
FIG. 5 is a rear side perspective view of a potentially preferred embodiment of an inventive cycle device with a trunk assembly included in closed position.
Figure 6:
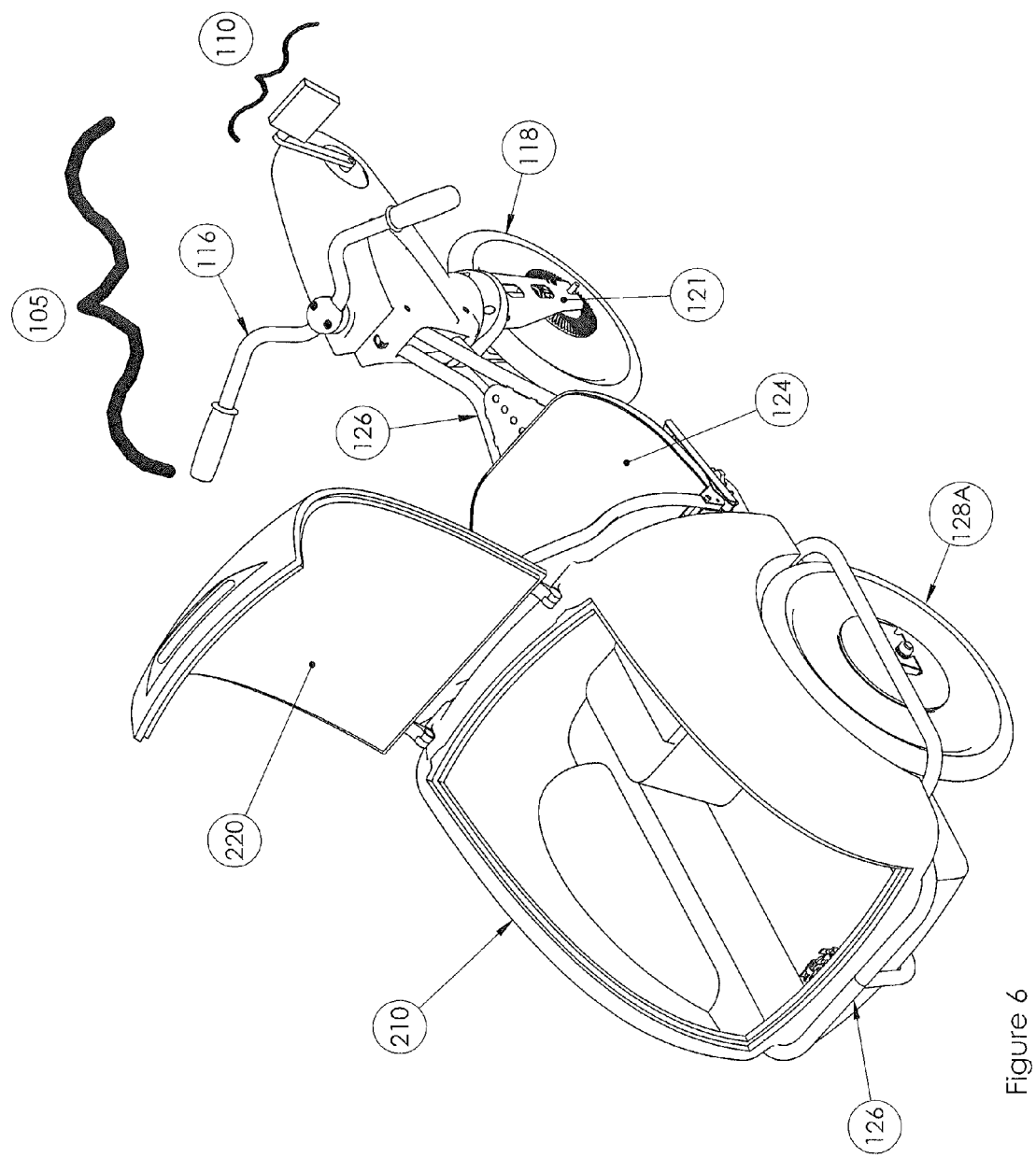
FIG. 6 is a rear side perspective view of the device of FIG. 5 with the trunk in open position.

FIG. 5 provides a view of a storage transport cycle device 200 that includes the same structures as in FIG. 4, above, but further includes a suitable trunk device 210 including a door 220 for transport capabilities. FIG. 6 thus shows the same device 200 as in FIG. 5 but with the door 220 opened for access therein the trunk 210.

Figure 7:
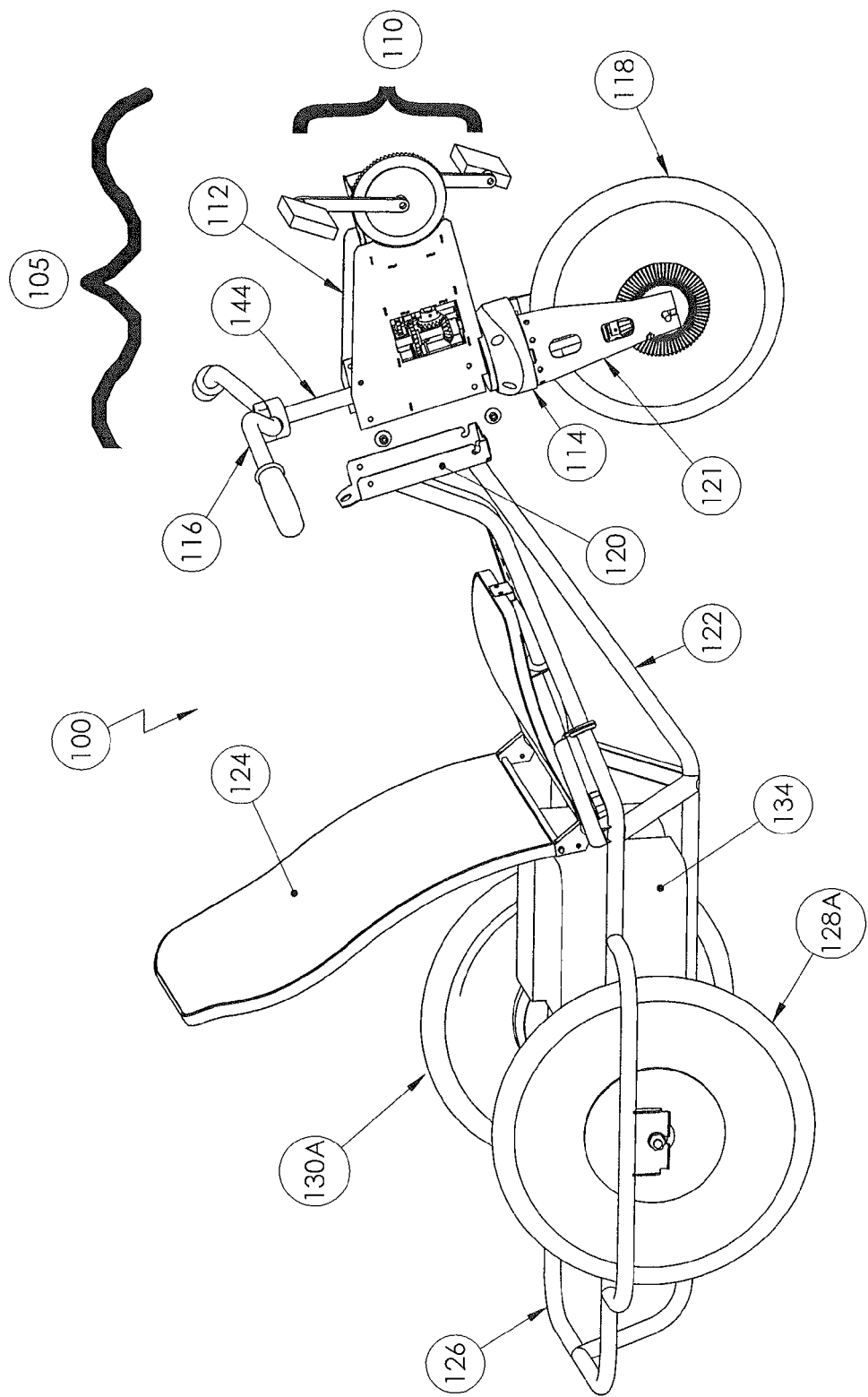
FIG. 7 provides a front side perspective view of a potentially preferred embodiment of an inventive cycle with the front wheel assembly separated from the seat and rear wheels assembly.
Figure 8:
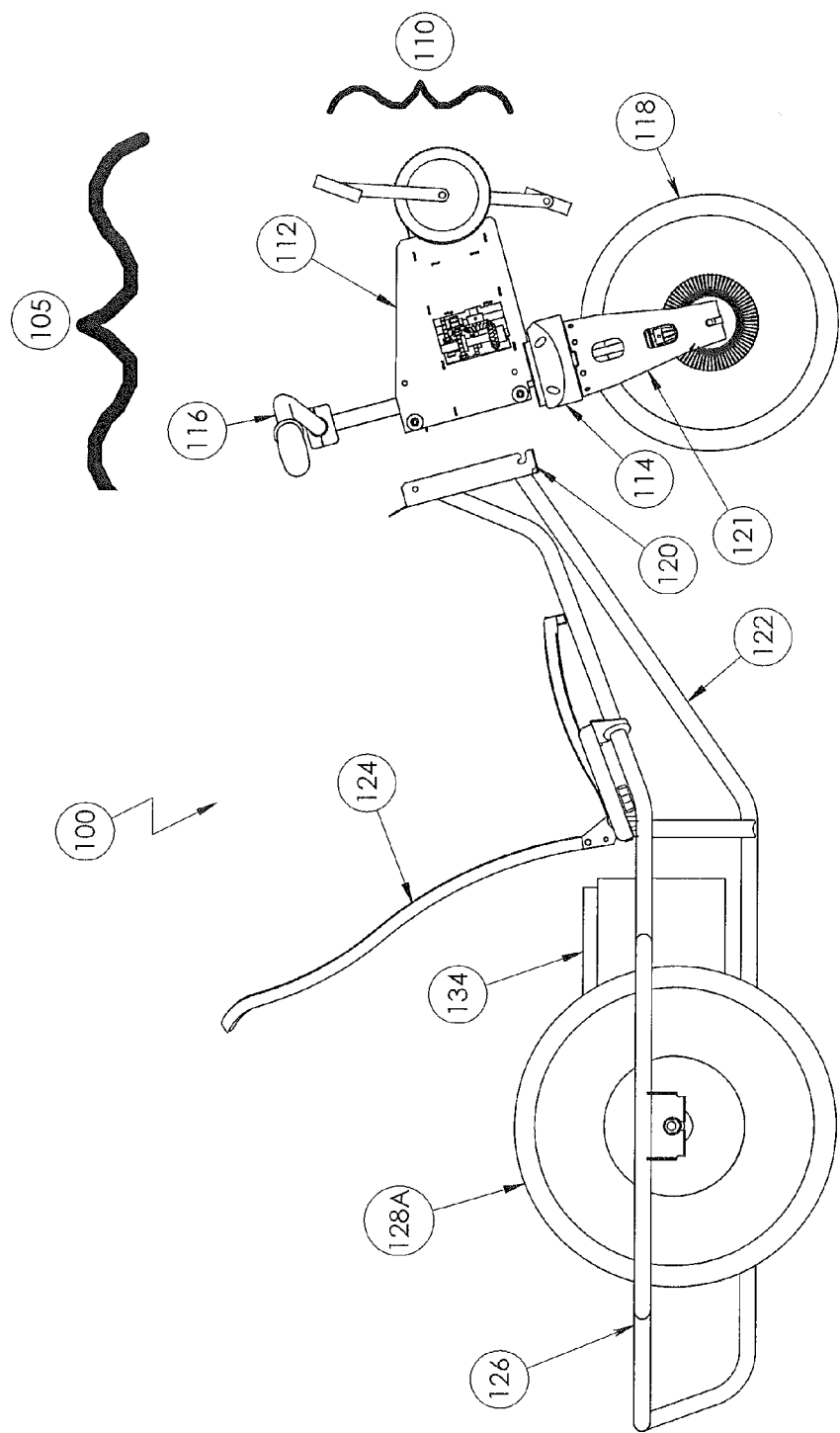
FIG. 8 is a side view of the device of FIG. 7.

FIG. 7 provides a view to the modular capabilities of the overall cycle device 100 in that the frame 122 is disconnected from the front wheel assembly 105 which may then be reattached on another similar device (not illustrated). The same result is provided in FIG. 8 at a different angle.

The resultant inventive device thus accords great versatility and capability for an operator to maneuver under high torque conditions with great steering stability. Additionally, the potential for transport facilitation and overall accessibility for a variety of short travel purposes, all with not only the ability to utilize both a manual and electrical motion protocol, but also for exercise activity, all show the unexpectedly effective results such a novel device accords a suitable user.

The preceding examples are set forth to illustrate the principles of the invention, and specific embodiments of operation of the invention. The examples are not intended to limit the scope of the method. Additional embodiments and advantages within the scope of the claimed invention will be apparent to one of ordinary skill in the art.

What I claim is:

1. A vehicle comprising a frame, a vehicle transmission, a manual pedal assembly, and a steering component exhibiting a steering axis, wherein said vehicle transmission comprises a fixed transmission assembly component that exhibits torque reduction and a subsequent movable transmission assembly component that exhibits torque multiplication, wherein said fixed transmission assembly component is attached to said frame and said movable transmission assembly component is rotatable about said steering axis, wherein said vehicle transmission comprises both direct and overdrive capacities, and wherein said fixed and movable components comprise a single power transmission path.

2. The vehicle of claim 1 wherein said vehicle transmission allows for the reduction of torque interference with vehicle steering.

3. The vehicle of claim 1 wherein said vehicle transmission includes an epicyclic gear assembly coaxial with said axis of steering.

4. The vehicle of claim 1, wherein said vehicle is a recumbent cycle device.

5. The vehicle of claim 2 wherein said vehicle is a recumbent cycle device.

6. The vehicle of claim 3 wherein said vehicle is a recumbent cycle device.

7. The recumbent cycle device of claim 4, wherein said device further comprises a recumbent seat, a frame having two opposing sides, a front wheel, and at least one rear wheel attached to allow rotation thereof.

8. The recumbent cycle device of claim 7, wherein said pedal assembly is configured on both sides of said frame, and wherein the operation of said pedal assembly exhibits a ratio of torque decrease of at least 1/10 for minimal torque interference with the steering of said device.

9. The recumbent cycle device of claim 7 wherein said recumbent cycle device includes a removable front wheel assembly, wherein said removable front wheel assembly includes said front wheel, said pedal assembly, and said vehicle transmission.

10. The recumbent cycle device of claim 7 wherein said recumbent cycle device includes a hinged front wheel assembly, wherein said hinged front wheel assembly includes said front wheel, said pedal assembly, and said vehicle transmission.

11. The recumbent cycle device of claim 7 wherein said cycle includes a rear component having two opposing wheels and space behind said recumbent seat for a trunk component to be placed for transport of articles therein during movement of said cycle device.

12. The recumbent cycle device of claim 7 wherein said cycle includes two rear wheels.

13. The recumbent cycle device of claim 5, wherein said device further comprises a recumbent seat, a frame having two opposing sides, a front wheel, and at least one rear wheel attached to allow rotation thereof.

14. The recumbent cycle device of claim 13, wherein said pedal assembly is configured on both sides of said frame, and wherein the operation of said pedal assembly exhibits a ratio of torque decrease of at least 1/10 for minimal torque interference with the steering of said device.

15. The recumbent cycle device of claim 6, wherein said device further comprises a recumbent seat, a frame having two opposing sides, a front wheel, and at least one rear wheel attached to allow rotation thereof.

16. The recumbent cycle device of claim 15, wherein said pedal assembly is configured on both sides of said frame, and wherein the operation of said pedal assembly exhibits a ratio of torque decrease of at least 1/10 for minimal torque interference with the steering of said device.

17. A vehicle comprising a frame, a vehicle transmission, a manual pedal assembly, and a steering component exhibiting a steering axis, wherein said vehicle transmission comprises a fixed transmission assembly component that exhibits torque reduction and a subsequent movable transmission assembly component that exhibits torque multiplication, wherein said fixed transmission assembly component is attached to said frame and said movable transmission assembly component is rotatable about said steering axis, wherein said vehicle transmission includes an epicyclic gear assembly coaxial with said axis of steering, wherein said epicyclic gear assembly is present within a steering fork structure, and wherein said fixed and movable components comprise a single power transmission path.

18. The vehicle of claim 17 wherein said vehicle transmission allows for the reduction of torque interference with vehicle steering.

19. The vehicle of claim 18 wherein said vehicle is a recumbent cycle device.

20. The recumbent cycle device of claim 19, wherein said device further comprises a recumbent seat, a frame having two opposing sides, a front wheel, and at least one rear wheel attached to allow rotation thereof.

21. The recumbent cycle device of claim 20 wherein said recumbent cycle device includes a removable front wheel assembly, wherein said removable front wheel assembly includes said front wheel, said pedal assembly, and said vehicle transmission.

22. The recumbent cycle device of claim 20 wherein said recumbent cycle device includes a hinged front wheel assembly, wherein said hinged front wheel assembly includes said front wheel, said pedal assembly, and said vehicle transmission.

23. The recumbent cycle device of claim 20 wherein said cycle includes a rear component having two opposing wheels and space behind said recumbent seat for a trunk component to be placed for transport of articles therein during movement of said cycle device.

* * * * *